No. 617,829. Patented Jan. 17, 1899.
R. P. GREER.
GAS CONCENTRATOR.
(Application filed Dec. 14, 1896.)
(No Model.) 2 Sheets—Sheet 1.

No. 617,829. Patented Jan. 17, 1899.
R. P. GREER.
GAS CONCENTRATOR.
(Application filed Dec. 14, 1896.)

(No Model.) 2 Sheets—Sheet 2.

UNITED STATES PATENT OFFICE.

ROBERT P. GREER, OF SAN FRANCISCO, CALIFORNIA.

GAS-CONCENTRATOR.

SPECIFICATION forming part of Letters Patent No. 617,829, dated January 17, 1899.

Application filed December 14, 1896. Serial No. 615,695. (No model.)

*To all whom it may concern:*

Be it known that I, ROBERT P. GREER, a citizen of the United States, residing at San Francisco, in the county of San Francisco and State of California, have invented certain new and useful Improvements in Gas-Concentrators; and I do hereby declare the following to be a full, clear, and exact description of said invention, such as will enable others skilled in the art to which it most nearly appertains to make, use, and practice the same.

This invention relates to improvements in stills, and more particularly to that class of stills used as a concentrator for obtaining rich ammoniacal liquors from poor liquors of the same kind.

The particular use for which this still is designed is that of treating the weak solutions of ammonia which are obtained from gas-manufactories to obtain strong solutions therefrom and by enriching the product or extracting the ammonia from the original product avoid the objection of freighting the excess of the waste material to the refining plant. Heretofore the refined ammonia which is produced has been procured from the refuse or waste that is technically known as "gas liquor" of the gas-manufactories. This liquor contains a very small percentage of ammonia, usually about one and one-half per cent., while the bulk of the liquor is undesirable for the purposes of the manufacture of ammonia. These gas-manufactories are located in most instances at considerable distances from the refining plant, where the ammonia is put in marketable form. The shipment of this gas liquor has been very expensive and increased the cost of the marketable ammonia by adding the cost of transportation of material which is waste in the refined ammonia.

It is the object of the invention to overcome the objection mentioned by placing at the gas-manufactories plants which will concentrate the ammonia contained in the gas liquor and yield a richer product for shipment, while reducing the cost of manufacture and maintenance of the stills and increasing its efficiency.

The invention consists in the construction of various parts of the plant and in the arrangement of the same, as well as in the method of treating the liquor to facilitate the concentration.

Figure 1:
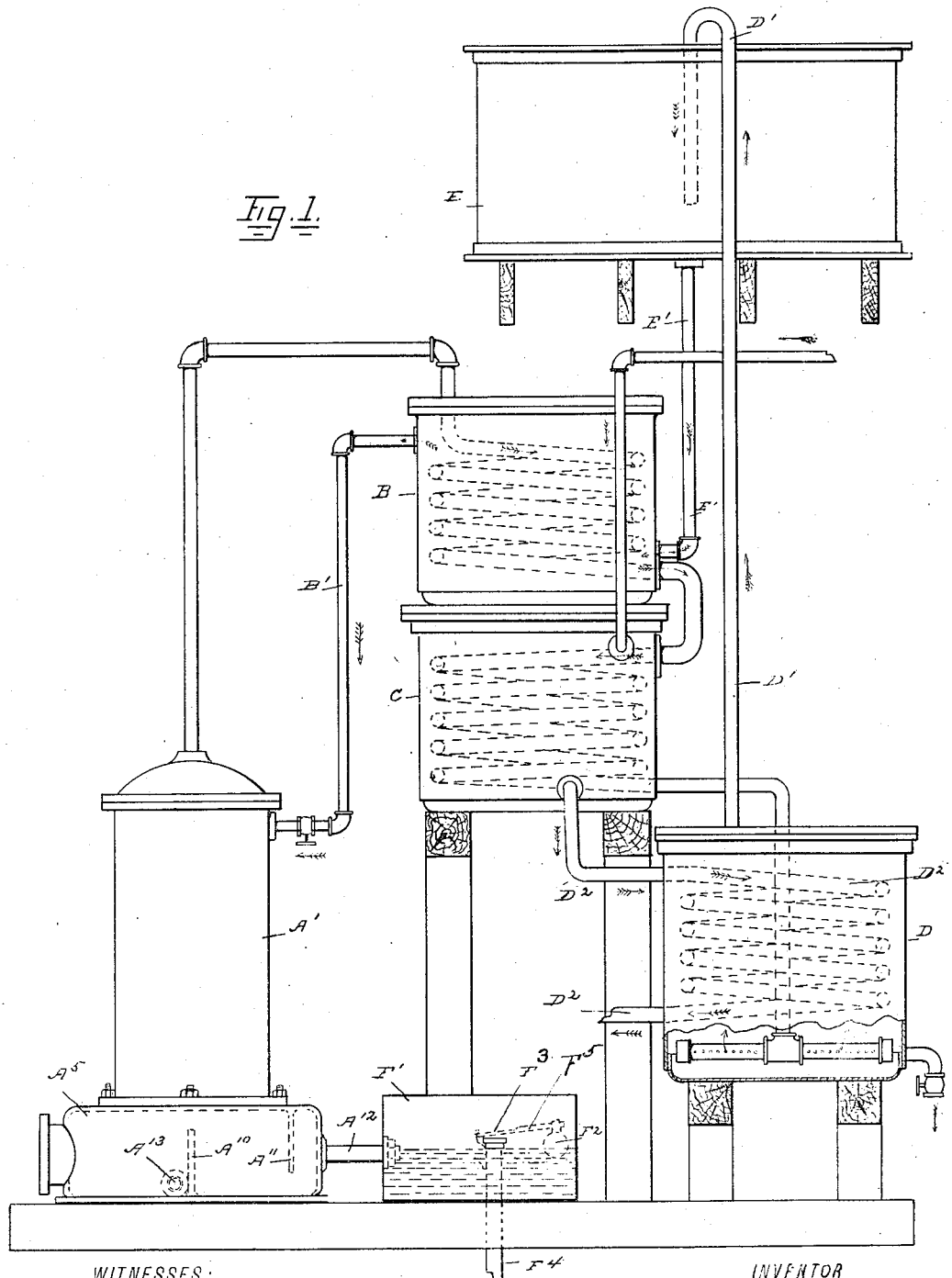
Figure 2:
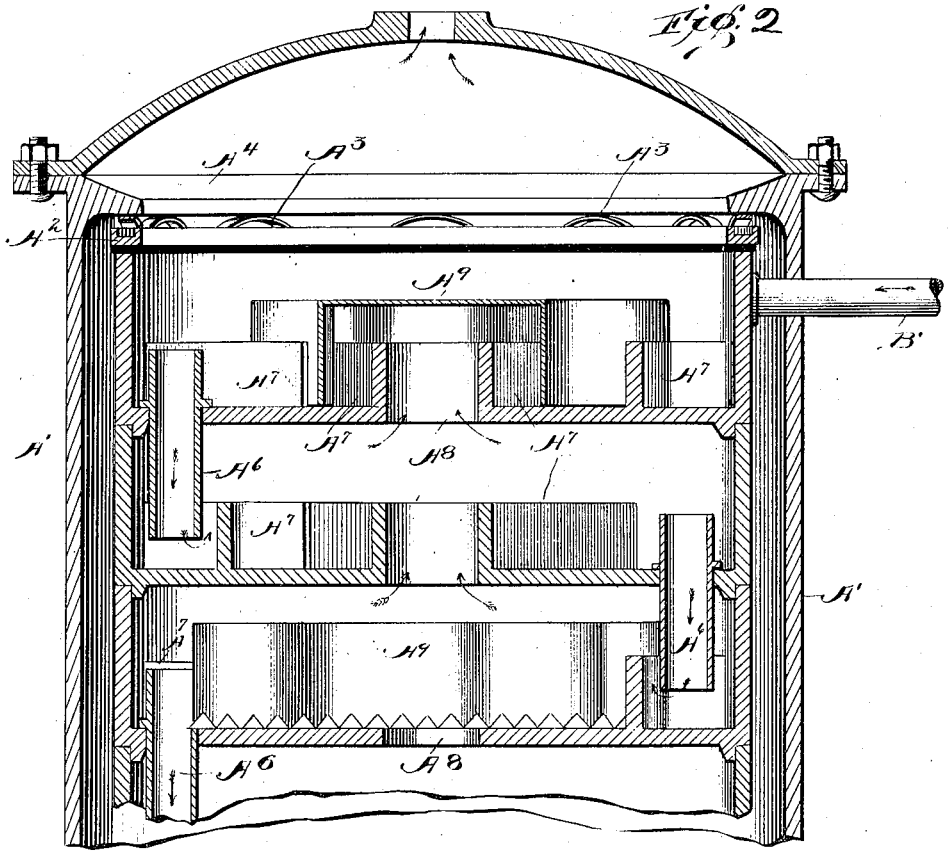
Figure 3:
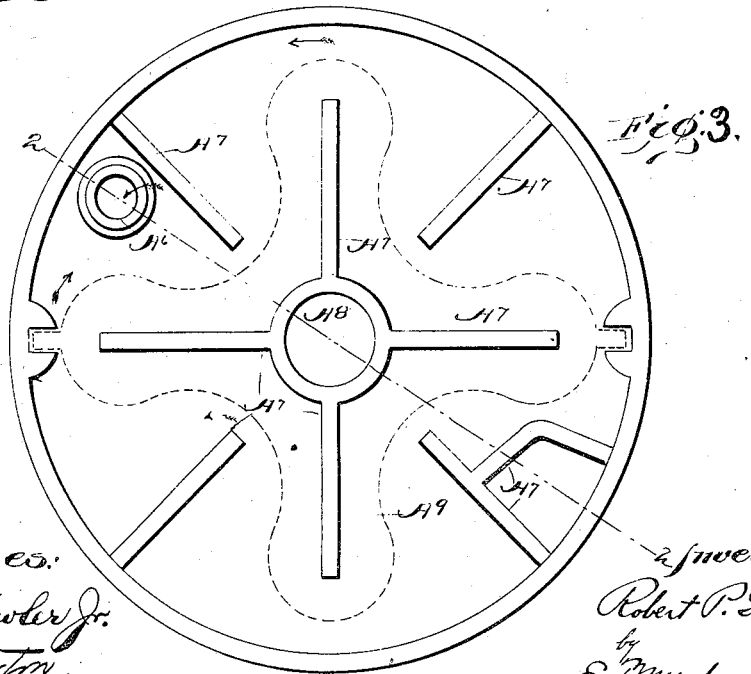

In the drawings, Figure 1 is a side view of the plant, the condensing coil or worm being shown in dotted lines. The inner structure and steam-pipe opening into the steam-box are also shown in dotted lines. Fig. 2 is a vertical section of the distilling-pile on the line 2 2 of Fig. 3, the uppermost compartment being shown entirely in section, the second compartment having the cap removed and the lowermost compartment shown as having the cap in place, said cap being here not sectioned. Fig. 3 is a plan view showing the interior arrangement of the distillation-chambers, the steam-controlling cap being removed, its location being shown in dotted lines.

The machine embodying this invention may be divided into several parts, each performing a distinct function in the operation of the whole. For convenience of description I will assign a distinguishing letter to all the elements of each in common, while assigning to each a discriminating figure in conjunction with its common distinguishing letter. These divided parts are the distilling-pile A, the preliminary heating-tank B, the cooling-tank C, the receiving-tank D, the reservoir E, and safety-valve F.

In the general operation of this plant the gas liquor is received from the gas plant into the reservoir E, and thence carried into the distilling-pile A, where it is distilled, the ammonia being separated and passing over from the top or dome of the distilling-pile through condensing coils or worms in the tanks B and C into the receiving-tank D. From this last tank it is drawn off as "rich liquor" into suitable receptacles for shipment. As it enters the distilling-pile the liquor contains about one and one-half per cent. of ammonia. To distil this ammonia out of the liquor, it is compelled to pass through successive chambers or compartments of the distilling-pile, in each of which it is brought into intimate contact with live steam, which is introduced in the bottom of the pile and rises to the top or dome through the descending liquid. The action of the heated steam on the liquor is to heat the same and cause volatilization of the ammonia contained therein. To accomplish this thoroughly, it is needful to bring the liquid and steam into intimate contact. For this purpose the construction of the chambers or compartments of the distilling-pile is designed as shown in the drawings. The various compartments are similarly constructed and are designed to rest the one upon the other and to form as nearly as possible a gas-tight joint between. To provide for the contingency of possible escapement of the gas through imperfect joints, the pile is covered by a continuous cylinder $A'$, the top of which forms the gas-dome, from whence the gas is collected and led off. To prevent any dislodgment of the compartments of the pile, they are held in place by the spring-cushioned gasket $A^2$, which rests upon the top of the pile, so as to present the springs $A^3$, let in its upper face, to the internal flange $A^4$ on the cylinder $A'$. When the cylinder $A'$ is bolted down in place, the flange $A^4$ compresses the springs $A^3$ sufficiently to exert a pressure on the pile, but not sufficient to hold the pile rigidly in position. By this construction two principal advantages are obtained: first, great facility in cleaning the compartments by removing the cylinder and separating them by merely lifting one compartment off those underneath, and, second, that of yielding to any internal strains or expansion without dislodgment of the parts, the springs $A^3$ returning the parts to position when the pressure is relieved. It is downward through these compartments that the gas liquor is compelled to travel until it is deposited in the steam-box $A^5$, Fig. 1. In passing from compartment to compartment it is led by the overflow-pipes $A^6$ to the succeeding compartment. The construction of each compartment is similar to that of the others, and said compartments are arranged relatively in such wise that the liquor is deposited in each on the side opposite that from which it is drawn by overflowing into the compartment below. It is to increase the distance traveled by the liquor from inlet to outlet that the interposed vanes or webs $A^7$ are provided. These webs are arranged as shown in Fig. 3 of drawings, the one set extending inward and the other set outward from the center. These webs are raised slightly higher than the overflow, and thus extend above the level of the liquid in the compartments. The purpose in causing the liquid to travel this diverted path is to maintain it in intimate contact with the rising steam, which in rising from one compartment to the other passes upward through the central passage $A^8$ in the bottom of each. Over the passage $A^8$ is placed a cap $A^9$, which confines the steam within it. The exits from under the cap $A^9$ are the openings formed by the serrations or scalloped form of its lower edge. These openings are formed so that their tops extend below the liquid or overflow level. When sufficient pressure is generated under the cap $A^9$, the steam is forced down and under the openings in the lower edge of the cap and down and through the liquor. By this arrangement the steam and liquor are brought in intimate contact each with the other, and the liquor being heated gradually the ammonia contained is liberated and passes upward with the steam until it finally reaches the dome and passes over to be condensed. By reason of the peculiar star shape of the cap the line of contact—that is, the lower edge of the said cap, where the steam and gas are forced down through the liquid—is generally increased over any more regular shape. Also as the said walls of the cap do not cross any of the webs, before referred to, there is no exit from under the cap except that designed, which is downward through the serrations of the lower edge of the said cap, the construction permitting of no leakage above the line of the liquor. A further feature of advantage in this particular shape is that it covers as large a space within the compartments as possible. As the heat is transmitted from the rising steam or vapors to the descending liquor by actual contact in these compartments, an increased heating-space is procured by reason of the large area of this cap. The heating influence for the steam is consequently much increased in each individual chamber or compartment. After the steam has acted upon the liquor in a compartment said steam and the liberated ammonia escape from such compartment through the scallops in the lower edge of the cap and then the steam and ammonia ascend to the top of the compartment and pass through the passage $A^8$ into the next higher compartment. The steam and ammonia thus traverse the successive compartments until finally they pass into the dome of the cylinder $A'$. In this process, just described, there has been a gradual transfer of heat from the steam to the liquor until the ammonia has been entirely volatilized, and when the liquor has reached the steam-box $A^5$ it is entirely freed from ammonia and very hot and about ready to pass into steam. In some instances where it is desired to economize steam I provide means for generating these liquors into steam to help perform the functions above described. This is accomplished by placing under the steam-box a gas jet or jets or the ordinary fire-box.

Referring now more particularly to the steam-box $A'$, it will be seen that it has at its bottom, at about its center, a steam-supply pipe $A^{13}$, through which the steam is supplied for use in the distilling-pile, as previously described, while from its side the outlet-pipe $A^{12}$ leads into the safety-valve box $F'$. Between the steam supply and the outlet two partitions $A^{10}$ and $A^{11}$ extend across the steam-box, one of said partitions $A^{10}$ being relatively near the steam-supply pipe and extending from the bottom of the box to a line near its top, and the second partition $A^{11}$ being located between the first partition and the outlet, relatively near the latter, and extending from the top of the box to a line near its bottom. The steam-box of course contains the liquor which has passed through the compartments of the distilling-pile, and the two partitions extending, as indicated, coöperate to prevent the incoming steam from passing to the outlet $A^{12}$. Furthermore, the liquor which passes through the outlet-pipe is necessarily drawn from under the partition $A^{11}$, and therefore the lower and cooler stratum of liquor in the box is that which is discharged, the warmer liquor being retained.

Whenever the quantity of water in the steam and valve boxes becomes too great, the float $F^2$ is raised to lift the valve $F^3$ from its seat over the end of the waste-pipe $F^4$, and the parts are thus maintained until the water in the boxes has been drained to lower the level until the valve is seated. A further purpose of this form of valve is to act as a safety-valve and relieve any sudden or uncalculated pressure in the distilling-pile.

It will be observed that as the space within the pile and the steam-box is practically one any pressure in this space will press upon the surface of the water in the steam-box on the left side of the partition $A^{11}$. This will of necessity have the effect of raising the water to the outside of the said partition and of raising the water in the valve-box, which opens the valve, as described, and maintains it open until the pressure is relieved and the water resumes its normal position. Referring to this valve, as shown sufficiently for present purposes in Fig. 1, it will be seen that the float is hung below the opening of the pipe $F^4$ to have the same in condition to allow any excess of water above that line to overflow and at the same time not to make the valve too sensitive in its action. Again, it will be noticed that the float is adjustable on the valve-arm $F^5$.

When distilled, as described, the steam and ammonia combined passes over through the outlet-pipe in the top of the dome of the pile and is carried to the worm or coil used for condensing. The worm is divided in two parts or sections—that contained in the tank B and that contained in the tank C. The two parts or sections differ only in their locations. In the tank B is received the gas liquor direct from the reservoir E by means of the pipe E', which enters the tank B at the bottom thereof. The outlet of this tank is into the pipe B', which leads into the top compartment of the distilling-pile from the top of the tank B. The purpose in both these tanks is the same—i. e., the cooling and condensing of the steam and ammonia contained within the worm. In the extraction of the heat from the worm, in the first instance by means of the gas liquor, however, a double object is sought and attained—that is, the cooling of the steam and ammonia and the heating of the gas liquor preliminary to its passing into the distilling-pile. In its action the cool gas liquor is introduced in the bottom of the tank B. As it rises in the tank it is brought in contact with gradually-hotter coils and rises in temperature until at the top of the tank as it overflows to the distilling-pile it is nearly as hot as the steam leaving the dome of the pile and in condition to give off rapidly its ammonia. By means of this preliminary heating I am saved a great deal of expense in that the distilling-pile does not require as many compartments as it would were the gas liquor transferred into it in a cool condition. The heat of the pile is also conserved, as the cooling influence of the cold liquor entering the pile is avoided. At the same time the condensation of the steam and ammonia is accomplished. In the tank C is contained cold water, which is colder than the gas liquor and is kept moving rapidly to avoid heating. This tank C may be as long as desired to condense the steam and ammonia. From the worm the condensed liquor is delivered to the receiving-tank D to be drawn off. In many instances it may be found that the liquid which has come over is not sufficiently cold to hold the ammonia, and part of it will endeavor to escape in a gaseous form. To provide for this, the receiving-tank is provided with an escape-pipe D', which extends from the top thereof up and into the reservoir E, so that any liberated gaseous ammonia will be delivered into the gas liquor. As this liberation of gas is largely induced by the fact that the water or liquid while in the receiving-tank is not sufficiently cold to hold the gas, I have endeavored to counteract the effect by placing the coil $D^2$ therein, said coil being included in the cold-water circulatory system above mentioned.

Having thus described this invention, I claim—

1. In a gas-concentrator a heating-compartment consisting in the combination of a series of shallow chambers each provided with a central opening in the bottom thereof for the passage of steam and gases, an overflow-pipe extended in each chamber above the bottom thereof to produce a water-level therein and extending down into the next lower chamber to below the water-level in the said lower chamber, webs or partitions extended upward from the bottom of the said chambers above the water-level thereof and arranged in two sets, those of the one set extending radially from the said central opening outward, and those of the other set extending from the sides of the said chamber inward with their ends interlapping those extending from the center outward and a cap or cover set over the said central passage to receive and hold the said steam and gases as the same are delivered from the chamber below the top of the said cap being above the water-level in each chamber and provided with a continuous downwardly-extended flange about the outer edge thereof adapted to rest below the water-level in the said chamber and so formed as to extend between the ends of the said webs without touching or crossing the same and provided with a scalloped or serrated lower edge, substantially as described.

2. In a gas-concentrator the combination of a still having compartments for transferring the liquor, by successive steps, from the top to the bottom, and for transferring the heated vapors through the same compartments upward, and having a lower compartment for the delivery of the waste material, said lower compartment being divided by interlapped partitions the one extended from the top downward and the other from the bottom upward; a steam-supply pipe opening into the lower compartment beneath the said still and to one side of the lapped partitions; an outlet-pipe leading from the said lower compartment from the opposite side of the said partitions and below the water-line thereof; a waste-tank to receive the said outlet-pipe and having mounted therein an overflow-pipe extending from the bottom thereof to the height of the water-level in the said lower compartment of the still; and a float-valve adapted to close the said overflow-pipe, substantially as described.

In testimony whereof I have hereunto set my hand this 29th day of October, 1896.

ROBERT P. GREER.

Witnesses:
  E. F. MURDOCK,
  BALDWIN VALE.